United States Patent [19]

Ipema et al.

[11] Patent Number: 4,573,311

[45] Date of Patent: Mar. 4, 1986

[54] LAWN RAKE

[75] Inventors: Neal J. Ipema, Simpsonville; William E. Portz, Anderson, both of S.C.

[73] Assignee: True Temper Corporation, Shiremanstown, Pa.

[21] Appl. No.: 650,968

[22] Filed: Sep. 14, 1984

[51] Int. Cl.$^4$ ............................................. A01D 7/06
[52] U.S. Cl. ................................................. 56/400.17
[58] Field of Search ........... 56/400.17, 400.18, 400.16, 56/400.21, 400.01

[56] References Cited

U.S. PATENT DOCUMENTS

| | | | |
|---|---|---|---|
| 1,706,507 | 3/1929 | Withington | 56/400.17 |
| 1,959,893 | 5/1934 | Brailie | 56/400.17 |
| 1,983,596 | 12/1934 | Carlson | 56/400.17 |
| 2,137,795 | 11/1938 | Brailie | 56/400.17 |
| 2,836,032 | 5/1958 | Melvin | 56/400.17 |
| 3,221,486 | 12/1965 | Godshall et al. | 56/400.17 |

*Primary Examiner*—Jay N. Eskovitz
*Attorney, Agent, or Firm*—John K. Williamson; John L. LaPierre

[57] ABSTRACT

A lawn rake having an improved means of tine containment. The tines are positioned and locked within a spreader bar heretofore used primarily for maintaining a spacial relationship between adjacent tines. Additionally, the tines are anchored within the rake socket portion by means of a spring clip which also coacts with a stiffener spring engaging the spreader bar to enhance fixed tine location within the rake head assembly.

6 Claims, 7 Drawing Figures

LAWN RAKE

BACKGROUND OF THE INVENTION

The present invention relates to lawn rakes and, more particularly, to improvement in rakes of the hand broom type having resilient tines and is useful for raking leaves, grass clippings, twigs, and the like. Specifically, the invention is directed to an improved heavy duty lawn rake having increased strength and rigidity and enhanced containment of tines within the rake head assembly.

There are a variety of lawn rakes available in the marketplace today. Rakes of this general type are well known in the art and are perhaps best exemplified by the patent to Dorman, U.S. Pat. No. 2,766,577, and the patent to Godshall et al, U.S. Pat. No. 3,221,486. The present inventive rake, however, provides an implement which overcomes disadvantages commonly associated with rakes of the type disclosed in these patents.

Specifically, an objective of the Dorman disclosure is to provide a rake wherein the resilient tines are more readily removable and replaceable. The resilient tines of the present invention are anchored both within the spreader bar and the socket, namely, the tines are affixed within the assembly and not placed for ready removal and replacement. While Dorman discusses a spreader bar locking rod, the rod merely maintains the tines in spaced relationship but does not lock the tines within the spreader bar itself. Thus, should a tine become dislocated at the rake socket, it could be pulled through to the spreader bar thus rendering the rake partially inoperative. Conversely, the tines of the present invention cannot be pulled through the spreader bar since they are trapped between the spreader bar walls. Additionally, the tines are secured within the socket by, at a minimum, socket crimping or by providing a spring clip which coacts with the spreader bar through a stiffener spring to rigidly locate the tines and, for that matter, the entire rake head assembly.

The Godshall et al disclosure, while also providing a tine spacer bar, likewise does not lock the tines within the spacer bar. Godshall, like Dorman, also speaks of the tines being locked to the spacer by a rod but upon reviewing the patent drawings it becomes clear that the rod of Godshall functions as the rod of Dorman, namely, to maintain the tines in spaced relationship only. Thus the rakes of both Godshall and Dorman share similar deficiencies, namely, having tines which may be more readily dislodged than tines of the present inventive rake. Of further interest is the assertion in Godshall that the disclosed rake is advantageous because it has substantially fewer parts and is more rapidly assembled than is the rake disclosed in Dorman. Both the rake of Godshall and the rake of Dorman have a greater number of component parts than does the instant rake. Specifically, the Godshall product has 10 components, the Dorman product has 12 components, but the present rake has a maximum of only 8 components, which maximum reduces to 7 if the socket rivet is eliminated, to 6 if a one piece clip is utilized, and to 4 should the stiffener spring and spring clip be removed to provide a rake in its simplest form. Thus, the present device has fewer parts and can be more rapidly assembled resulting in a rake more cost efficient to manufacture while providing a rake of increased strength and durability.

In summary, the present inventive rake provides many advantages over existing art rakes wherein the present rake incorporates a spreader bar which separates the tines, reinforces the tines via a stiffener spring and increases rake strength by tying the tines together in a unit as well as providing individual tine retention by detenting. Additional unit strength is gained through use of an improved spring clip for anchoring the tines at the non-working end. Longitudinal movement of spring clip and stiffener spring may be restricted by use of a rear tab included as part of the spring clip which engages a groove staked in the socket. Maintaining clip location by locking the clip wrapped about the socket substantially strengthens the socket which holds the tines in place with a positive lanced stake to keep the socket from being forced open during heavy use or handle overdrive during handle installation. A rivet or the like may be included rewardly of the spring clip location to provide increased assurance against harmful socket separation and tine dislocation while additionally providing a positive handle stop to prevent handle installation overdrive.

SUMMARY OF THE INVENTION

The present invention relates to a lawn rake wherein the rake includes a handle and an improved rake head assembly incorporating means for enhancing tine securement within the assembly. The handle and tines are fastened within opposite ends of a socket. A spreader bar, spaced from the socket and located intermediate the working ends of the tines, maintains the tines in spaced relationship and includes a detent formed in the spreader bar along substantially its entire length to thereby fixedly secure the tines between the spreader bar walls. A stiffener spring may be used to engage both the spreader bar and the tine receiving end of the socket to further enhance tine placement. A spring clip simultaneously clamps the stiffener spring to the socket while anchoring the tines within the socket. The coaction of spring clip and spreader bar biased by the stiffener spring rigidly supports the rake head assembly while securely affixing the tines in place to provide an improved heavy duty lawn rake.

The various features of novelty which characterize the invention are pointed out with particularity in the claims annexed to and forming a part of this disclosure. For a better understanding of the invention, its operating advantages and specific results obtained by its use, reference should be made to the accompanying drawings and descriptive matter in which there is illustrated and described a typical embodiment of the invention.

DETAILED DESCRIPTION OF THE PREFERRED EMBODIMENT

Figure 1:
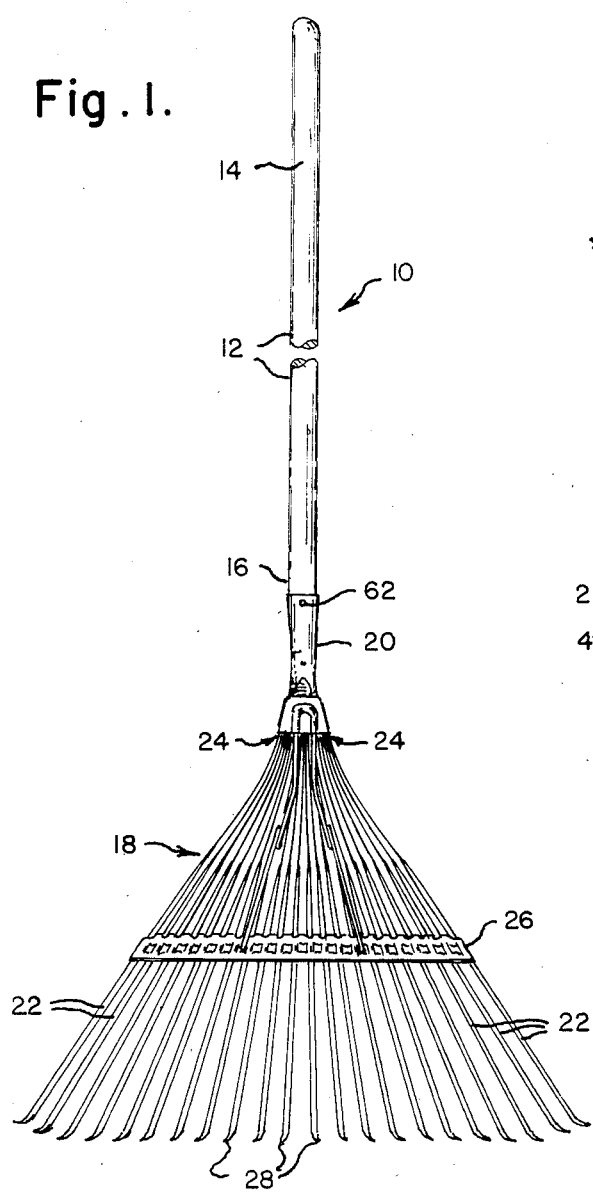
FIG. 1 is a top plan view of a lawn rake embodying the principles of the present invention wherein there is depicted a rake head assembly portion and a foreshortened handle portion.

The description herein presented refers to the accompanying drawings in which like reference numerals refer to like parts throughout the several views, and in which, referring to FIG. 1, there is illustrated a partial top plan view representing the lawn rake 10 embodying the inventive apparatus. The apparatus includes an elongated member or handle 12 having a hand gripping portion 14 and an opposed end portion 16 terminating in opening 19 of socket portion 20 of rake head assembly 18.

Figure 4:
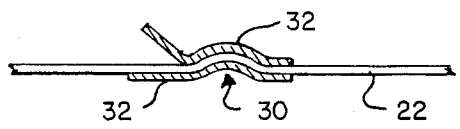
FIG. 4 is a sectional view taken along line 4—4 of FIG. 2 and showing a typical locking of a tine within a spreader bar utilized to maintain spacing between the tines.
Figure 2:
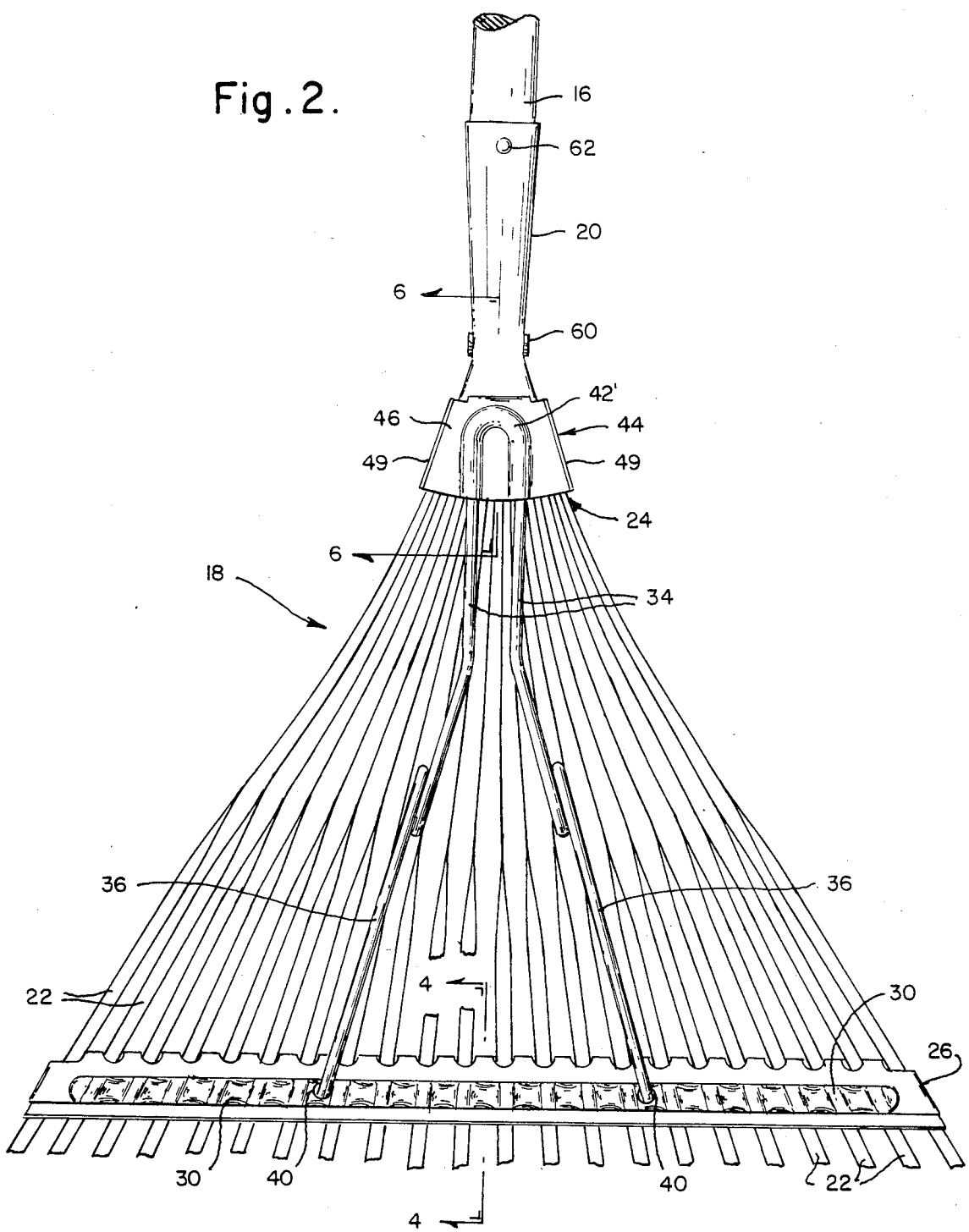
FIG. 2 is an enlarged framented top plan view of the lawn rake illustrated in FIG. 1.
Figure 3:
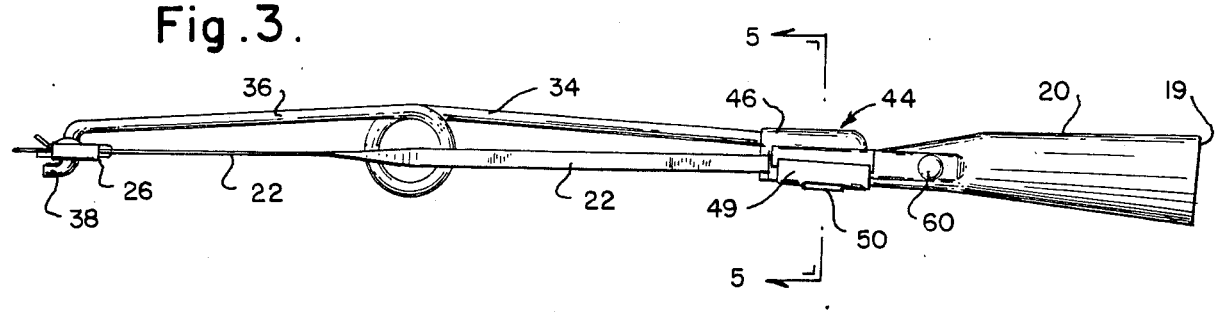
FIG. 3 is a fragmented side elevational view of the lawn rake shown in FIG. 2.

Turning now to FIG. 2, there will be seen in greater detail an enlarged fragmented view of the rake head assembly 18 depicted in FIG. 1. Specifically, FIG. 2 illustrates tines 22 displayed in a fan shaped array and gathered at tine end 24 at the socket end of the assembly. A spreader bar 26 located between socket 20 and the working ends 28 of tines 22 functions to maintain a spaced relationship between tines and includes a detent 30 along substantially the entire length of spreader bar 26 locking the tines 22 within walls 32. The spreader bar detent is best illustrated in FIG. 4. A stiffener spring 34 having arms 36, at one end engages spreader bar 26 at ends 38 (as best seen in FIG. 3) projecting through openings 40 in the spreader bar while at the other end looped base 42 of stiffener spring 34 contacts socket 20 at its tine receiving end 21. A spring clip 44 having a top portion 46 and a bottom portion 48 wraps about socket 20 and base 42 (location 42') of stiffener spring 34 simultaneously clamping the spring base against the socket while anchoring the tines within the socket. Spring clip 44, as shown, is a two piece assembly wherein top portion 46 includes tabs 50 for location within slots 51 of bottom portion 48. It should be understood that the spring clip could be a one piece wrap having one or more tabs and one or more slots. Additionally, it should be understood that in a multi-piece clip structure any one piece could have one or more tabs and one or more slots.

Figure 5:
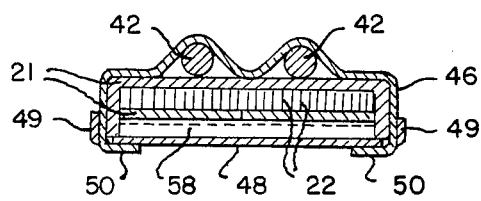
FIG. 5 is an enlarged sectional view taken along line 5—5 of FIG. 3 and depicting the tines being located and anchored within a socket by means of a multi-piece spring clip.
Figure 7:
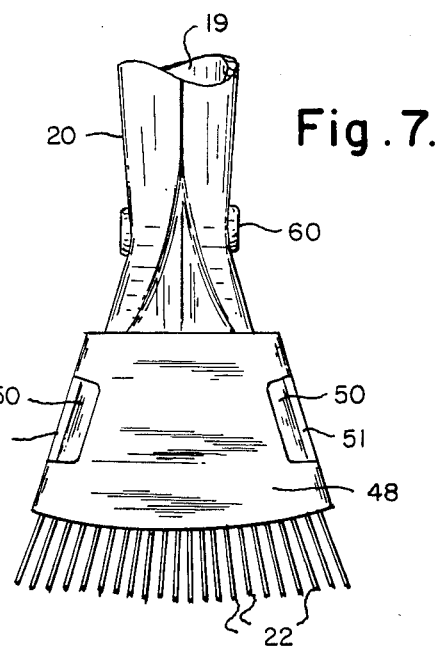
FIG. 7 is an enlarged fragmented bottom plan view of the rake of FIG. 2 illustrating the bottom of the spring clip in place.
Figure 6:
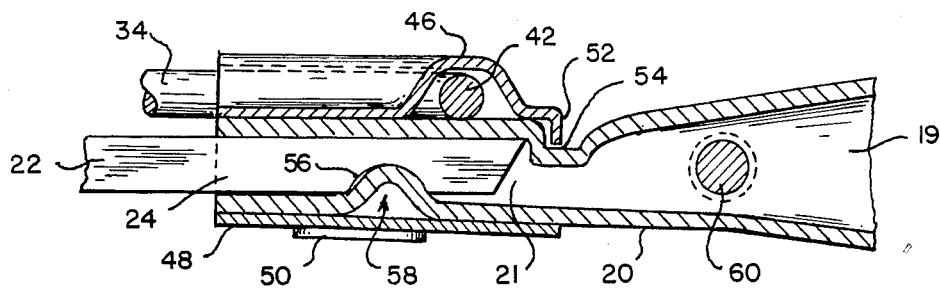
FIG. 6 is an enlarged sectional view taken along line 6—6 of FIG. 2 and illustrating the tine receiving end of the socket but having a line of sight oriented perpendicularly with respect to the view of FIG. 5.

The interaction amongst spring clip pieces, socket, and tines is perhaps best illustrated in FIGS. 5 through 7. Tabs 50 of clip top portion 46 project through slots 51 and are folded against clip bottom portion 48 while upwardly projecting portions 49 of portion 48 engage clip portion 46 along its sides. Projecting portion 52 in clip part 46 is located within notch 54 staked into socket 20 to enhance clip locking and to prevent longitudinal clip dislocation during periods of rake use as clip dislocation would lead to tine release and rake failure. It should be understood that either part of the spring clip could include projecting portion 52 for engaging an appropriately positioned notch 54 staked into socket 20. Tines 22 at their gathered end 24 are located in opening 21 of socket 20 and each tine includes a notch 56 for positioning and locking in socket detent 58. The spring clip portions are forced together and locked in place by tabs 50 thereby anchoring therewithin stiffener spring 34 at its base 42 and causing socket 20 at tine receiving end 21 to engage tines 22 along the top of end portion 24 and along the bottom of portion 24. Additionally, detent 58 located in tine notch 56 anchors tines 22. Spring clip 44 thus secures component parts at the end 21 of socket 20 and acting with stiffener spring 34 and spreader bar 26 rigidly supports tines 22 and rake head assembly 18. Customarily, end portion 16 of handle 12 is wedged into socket opening 19. A rivet 60 or like device may be placed through socket 20 to strengthen the socket and provide a stopping device to prevent handle overdrive during handle placement within socket opening 19. A fastening device such as a nail, screw, or the like, may be placed through opening 62 in handle receiving end 19 of socket 20 to secure handle end portion 16 within the socket.

While in accordance with the provisions of the statutes there is described herein a specific embodiment of the invention, those skilled in the art will understand that changes may be made in the form of the invention covered by the claims appended hereto without departing from the scope and spirit thereof, and that certain features of the invention may sometimes be used to an advantage without corresponding use of the other features.

The embodiments of the invention in which an exclusive property or privilege is claimed are defined as follows:

1. A lawn rake comprising:
   an elongated member having a hand gripping portion at one end thereof,
   a rake head assembly including a socket, one end of said socket receiving and retaining the other end of said elongated member,
   said rake head assembly further including a plurality of tines, one end of said tines being located in the other end of said socket,
   each of said tines having a notch at said socket end for engaging a detent located in said socket at the tine receiving end,
   a spreader bar disposed intermediate the tine receiving end of said socket and the opposed working ends of said tines for maintaining said tines in spaced relationship,
   means for fixedly securing said tines within said spreader bar,
   crimping means for anchoring said tines within the socket,
   a spring clip substantially enveloping and further crimping the tine receiving end of said socket enclosing the ends of said tines therewithin, and
   a stiffener spring having a pair of arms engaging said spreader bar and a base forming a loop, said spring base being interposed between said clip and the outer surface of said socket and secured thereto by said clip.

2. The rake according to claim 1 wherein said clip is a one piece structure having at least one tab and at least one tab receiving slot for locking said clip in position.

3. The rake according to claim 2 wherein said clip further includes a projecting portion adapted for location within a notch staked into said socket.

4. The rake according to claim 1 wherein said clip is a two piece structure, one of said pieces having a plurality of tabs, the other of said pieces having a plurality of slots for receiving and locking said tabs within said slots thereby coupling said pieces and locking said clip in position.

5. The rake according to claim 4 wherein each of said pieces includes at least one tab and at least one slot.

6. The rake according to claim 5 wherein one of said pieces further includes a projecting portion adapted for location within a notch staked into said socket.

* * * * *